UNITED STATES PATENT OFFICE.

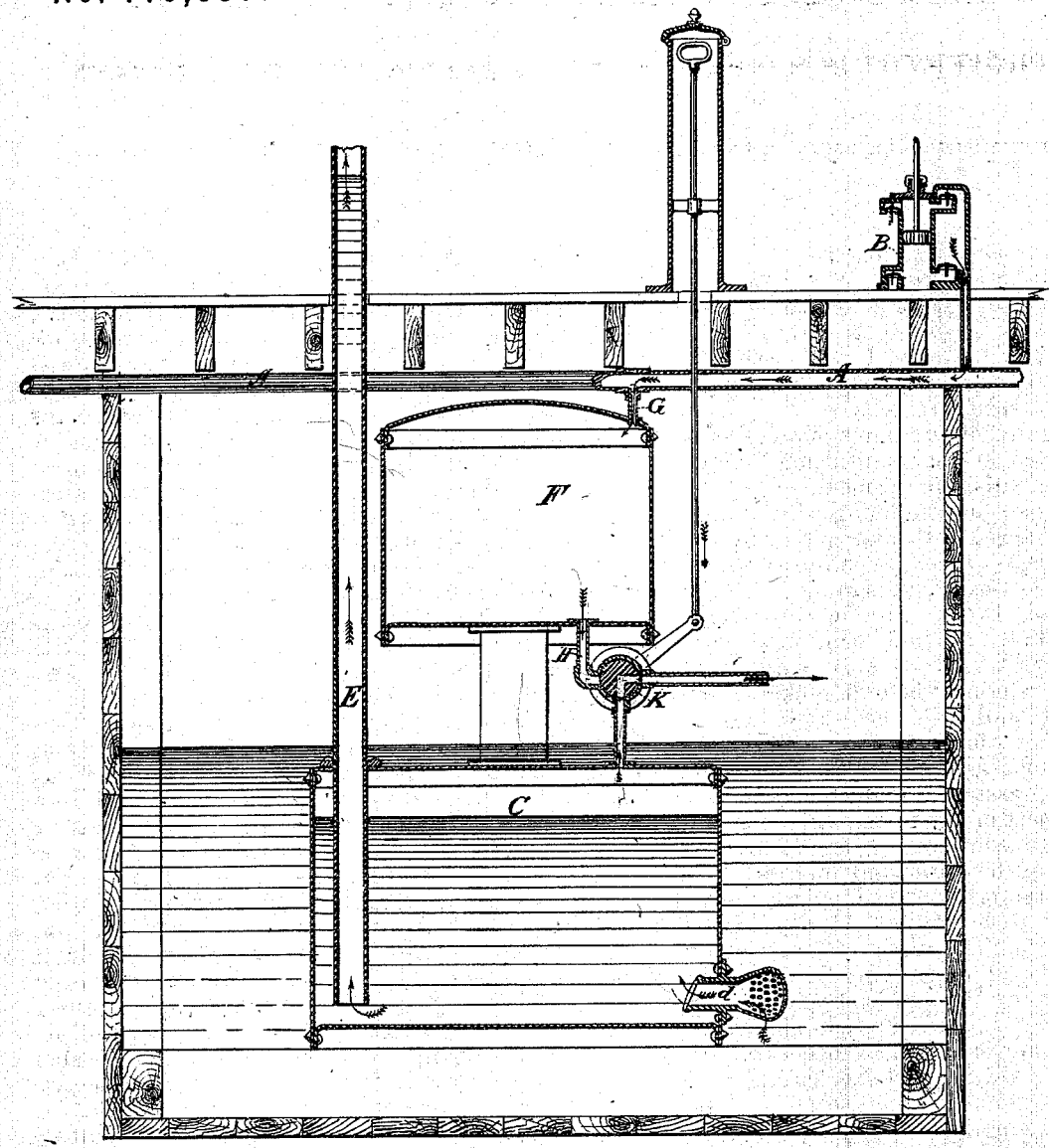

WILLIAM E. PRALL, OF WASHINGTON, DISTRICT OF COLUMBIA.

IMPROVEMENT IN HYDRO-PNEUMATIC APPARATUS FOR RAILWAYS.

Specification forming part of Letters Patent No. 146,357, dated January 13, 1874; application filed December 18, 1873.

*To all whom it may concern:*

Be it known that I, WILLIAM E. PRALL, of Washington, District of Columbia, have invented an Improved Apparatus for Elevating Water by Means of Compressed Air, for railroad and other purposes, of which the following is a specification:

This invention relates more especially to an improved system of utilizing compressed air as an auxiliary in the management of railways. It consists in combining with a main supply-pipe charged with and conveying compressed air from suitable air-compressors, and with an air-tight water-tank arranged to be filled automatically from a suitable water-supply, an intermediate air-tank connected with the air-main by a small pipe, so as to be continually fed therefrom without diminishing the pressure therein, and with the water-tank by a pipe sufficiently large to allow, when opened, a very quick or nearly instantaneous communication of the pressure from the one tank to the other; the object of my invention being to obtain an instantaneous application of pressure to the water in the water-tank and its quick, sudden discharge without reducing materially, by a sudden withdrawal of the required full supply therefrom, the pressure in the main air-pipe.

In the accompanying drawing, A is an extended air-pipe, consisting of tubes properly laid and connected to hold and convey air under compression, and which I contemplate extending along the entire length of a railroad, or of sections thereof, so as to obtain therefrom a supply of compressed air for the elevation of water at all desired points. B represents an air-compressor of any suitable description, and of a size sufficient to keep the main pipe charged to its full capacity with air at the desired degree of compression. If there be water-power at any point along the line of the road, the air-supply may be obtained at a nominal cost by driving the air-pumps or compressors with the water-power. C is a water-tank made air-tight. It may be submerged in a well, pond, or running stream, or otherwise placed with reference to a suitable source of water-supply, so that the water may naturally flow into and fill the same when empty through a pipe, d, fitted with a valve to permit a free ingress of the water, but prevent its reflow. By burying or submerging the tank it is protected from all exposure to frost. E is a discharge-pipe opening into the tank near the bottom thereof, and extending upward either to connect with a water-crane on the railroad or to be carried to any other desired point. F is an air-tank of such size with relation to the water-tank C as that it will in itself hold a quantity of compressed air sufficient to force out and discharge all the water in the water-tank, the relative proportions of the two differing necessarily with the degree to which the air is compressed. G is a small open pipe connecting the air-tank F with the main pipe A, and which is of such a reduced diameter as that a flow of air through the same from the main pipe cannot be great enough to materially reduce the pressure in said main pipe. H is a larger pipe closed by a three-way cock, and connecting the air-tank F with the top of the water-tank C, and of such proportions as that, when opened, it will permit a quick passage of the air from the tank F to the tank C, so that the full pressure in the former may be instantly communicated to the latter upon opening the valve. K is a three-way cock placed in the pipe H, and so arranged as that, when communication between the tanks F and C is thereby closed, communication will be established between the tank C and the outer air, so as to allow a quick, free exhaust of air from the tank when the pipe N is closed, which said communication will, in turn, be closed by the movement of the cock to open the pipe H. The cock K may be arranged to be operated, by a lever or otherwise, from a point convenient to the water-crane.

With the apparatus thus constructed, it is only necessary to turn the cock K to admit a discharge of the compressed air in the tank F into the tank C. Its pressure upon the surface of the water will thereupon operate to close the check-valve in the supply-pipe d and force the water out through the discharge-pipe E to its full capacity. So soon as a sufficient quantity of water has been drawn from the tank C and the cock K is closed, the closing of the cock will permit an exhaust of the compressed air remaining in the tank and allow a supply of water to flow in through the pipe d to refill it. So soon as air is drawn, as above, from the tank F, a supply commences to flow thereinto from the main A, and the flow continues until the tank is filled again, although, in consequence of the small diameter of the connecting-pipe G, the operation is made so gradually as not to reduce materially the pressure in the main.

I contemplate combining two or more air-tanks with a single water-tank, so that, when it is necessary to empty the latter oftener than the gradual filling of a single air-tank will allow without too great delay, the required charge of compressed air may be drawn from the one while the other is yet filling. It is also evident that two or more water-tanks may, in like manner, be combined with a single air-tank to save delay, where the flow of water is slow at the desired point.

I do not claim as new the use of compressed air for expelling water from a self-filling water tank or reservoir; but

I claim as my invention—

The combination, substantially as herein described, of one or more air-tight water-tanks, C, provided with suitable discharge-pipes and inlets, with an extended pipe or main, A, to be kept charged with compressed air, and with one or more intermediate air-tanks, F, each connected to the main pipe A by a pipe, G, of so small a diameter with reference thereto as that the constant pressure maintained therein will not be materially reduced by the escape of air through said connecting-pipe, substantially as herein set forth.

W. E. PRALL.

Witnesses:
  DAVID A. BURR,
  ROBT. G. LOUGHERY.